United States Patent
Palanisamy et al.

(10) Patent No.: US 7,197,503 B2
(45) Date of Patent: Mar. 27, 2007

(54) INTELLIGENT RETRIEVAL AND CLASSIFICATION OF INFORMATION FROM A PRODUCT MANUAL

(75) Inventors: Lingathurai Palanisamy, Tamil Nadu (IN); Sreedharan Venkataraman, Thanjavur (IN); Sindhu Joseph, Kerala State (IN)

(73) Assignee: Honeywell International Inc., Morristown, NJ (US)

( * ) Notice: Subject to any disclaimer, the term of this patent is extended or adjusted under 35 U.S.C. 154(b) by 754 days.

(21) Appl. No.: 10/305,809

(22) Filed: Nov. 26, 2002

(65) Prior Publication Data

US 2004/0103116 A1 May 27, 2004

(51) Int. Cl.
G06F 17/00 (2006.01)
G06F 7/00 (2006.01)

(52) U.S. Cl. ............... 707/101; 707/6; 707/4; 707/102

(58) Field of Classification Search ........... 707/102, 707/6, 4, 101
See application file for complete search history.

(56) References Cited

U.S. PATENT DOCUMENTS

| | | | |
|---|---|---|---|
| 5,283,838 A | 2/1994 | Togawa et al. | |
| 5,343,465 A | 8/1994 | Khalil | |
| 5,619,709 A | 4/1997 | Caid et al. | 395/794 |
| 5,625,552 A | 4/1997 | Mathur et al. | 364/162 |
| 5,640,494 A | 6/1997 | Jabri et al. | 395/24 |
| 5,724,987 A | 3/1998 | Gevins et al. | 128/731 |
| 5,963,965 A | 10/1999 | Vogel | |
| 5,974,412 A | 10/1999 | Hazlehurst et al. | 707/3 |
| 6,035,057 A | 3/2000 | Hoffman | 382/159 |
| 6,134,541 A | 10/2000 | Castelli et al. | |
| 6,157,921 A | 12/2000 | Barnhill | 706/16 |
| 6,171,480 B1 | 1/2001 | Lee et al. | 210/85 |
| 6,178,417 B1* | 1/2001 | Syeda-Mahmood | 707/3 |
| 6,226,408 B1 | 5/2001 | Sirosh | 382/224 |
| 6,625,585 B1 | 9/2003 | MacCuish et al. | 706/10 |
| 6,735,578 B2* | 5/2004 | Shetty et al. | 706/16 |
| 6,768,999 B2* | 7/2004 | Prager et al. | 707/102 |
| 6,826,553 B1* | 11/2004 | DaCosta et al. | 707/1 |
| 6,886,010 B2 | 4/2005 | Kostoff | |
| 6,904,420 B2 | 6/2005 | Shetty et al. | |
| 6,931,418 B1 | 8/2005 | Barnes | |
| 2002/0069218 A1 | 6/2002 | Sull et al. | 707/501.1 |
| 2002/0099675 A1 | 7/2002 | Agrafiotis et al. | |
| 2002/0129015 A1 | 9/2002 | Caudill et al. | 707/6 |
| 2003/0035063 A1* | 2/2003 | Orr | 348/465 |
| 2003/0210816 A1 | 11/2003 | Comaniciu et al. | |

OTHER PUBLICATIONS

"Self-Organizing Feature Extraction in Recognition of Wood Surface Defects and Color Images", International Journal of Pattern and Artificial Intelligence, vol. 10, No. 2, 1996, pp. 97-113.*

(Continued)

Primary Examiner—John Cottingham
Assistant Examiner—Kuen S. Lu
(74) Attorney, Agent, or Firm—Kris T. Fredrick

(57) ABSTRACT

An intelligent information-mining system extracts desired intelligent information from unstructured text data in documents to categorize the unstructured text data based on the extracted desired intelligent information. This is accomplished by obtaining unstructured text data from documents in an electronic format. The obtained unstructured text data is then transformed into unstructured neutral format data. The transformed unstructured neutral format data is then converted into structured data based on desired intelligent information. Desired intelligent information is then extracted from the structured data by using a multilayer self-organizing maps (MSOM) algorithm.

17 Claims, 4 Drawing Sheets

OTHER PUBLICATIONS

"Latent Semantic Indexing by Self-Organizing Map", Kurimo et al., IDIAP CP-592, Ru du Simplon 4, CH-1920 Martigny, Switzerland.*

Suganthan, P. N.:"Structured Adaptive Multilayer SOM with Partial Supervision for Numeral Recognition", Proceedings of the 1977 International Conference on NIP and IIS, vol. 2, pp. 1235-1238, 1977.*

Geffner, Steven, et al., "The Dynamic Data Cube", *EDBT 2000, LNCS 1777*, Springer-Verlag,(2000),237-253.

Kurimo, M. , et al., "Fast Latent Semantic Indexing of Spoken Documents By Using Self-Organizing Maps", *2000 IEEE International Conference on Acoustics, Speech, and Signal Processing*, Part 4, vol. 4, (Jun. 2000),2425-8.

* cited by examiner

INTELLIGENT RETRIEVAL AND CLASSIFICATION OF INFORMATION FROM A PRODUCT MANUAL

CROSS-REFERENCE TO RELATED APPLICATION

This application is related to the co-pending, commonly assigned U.S. patent application Ser. No. 09/825,577, filed May 10, 2001, entitled "INDEXING OF KNOWLEDGE BASE USING MULTILAYER SELF-ORGANIZING MAPS WITH HESSIAN AND PERTURBATION INDUCED FAST LEARNING" is hereby incorporated by reference in its entirety.

FIELD OF THE INVENTION

This invention generally relates to the field of information mining, and more particularly to an automated intelligent information extraction from electronic text documents.

BACKGROUND

Extracting, filtering, and evaluating information from large text documents in electronic format can be difficult due to a lack of inherently defined structure and high dimensionality in the available information sources in the text documents. For example, Aircraft Maintenance and Operations Support System (AMOSS) requires knowledge from airline maintenance manuals to make intelligent decisions. These airline maintenance manuals in human-readable format consist of text in unstructured format, such as flowcharts for fault isolation, repair procedures for fault rectification, observations and a list of fault codes for various possible faults.

Current information-mining techniques such as hierarchical keyword searches, statistical and probabilistic techniques, and summarization using linguistic processing, clustering, and indexing dominate the unstructured text-processing arena. The most prominent and successful of current information-mining techniques require large databases including domain-specific keywords, comprehensive domain-specific thesauruses, and computationally intensive processing techniques.

For example, in classifying and identifying fault information from complex unstructured data, humans can only understand/read airline manuals, such as maintenance manuals, fault isolation procedures, troubleshooting manuals, repair manuals, wiring diagram manuals and so on. Currently document-to-knowledge (D2K) tools are used to convert unstructured, meaningless data in the manuals to meaningful data. D2K tools use a text extraction module as the major processor for extracting intelligent information from the manuals, including unstructured text. The text extraction module in the D2K tool uses a regular expression-based search engine to identify and classify fault information from the manuals. Regular expressions sometimes are referred to as regex, grep, or pattern matching. Writing regular expressions is very cumbersome and time consuming. Further, writing regular expressions requires domain knowledge and expertise in the field. Furthermore, writing regular expressions requires significant human effort. In the case of aircraft manuals consisting of large text documents, it can take nearly 4 months to classify and identify fault information using the regular expression search engine. Whenever there is a change in the unstructured text documents due to updates, extracting the desired intelligent information from the updated text document using regular expressions could be a very time consuming task. In addition, the accuracy of the identified and classified information is only about 70%.

SUMMARY OF THE INVENTION

An intelligent information-mining system extracts desired intelligent information from unstructured text data in documents. This is accomplished by obtaining unstructured text data from documents in an electronic format which is then transformed into unstructured neutral format data. The transformed unstructured neutral format data is then converted into structured data. Desired intelligent information is then extracted from the structured data by inputting the converted structured data into a multilayer self-organizing maps (MSOM) algorithm.

In one embodiment, the MSOM algorithm extracts key-phrases from the unstructured text data, and transforms each of the extracted key-phrases into a unique numerical representation. The algorithm generates two or more layers of contextual relation maps by mapping the transformed text to two-dimensional maps, respectively using a self-organizing map and a combination of Hessian matrix and Perturbation (function approximation of neighborhood) techniques for speeding up a learning process. Word clusters are formed, and corresponding key phrase frequency histograms are constructed for each of the generated contextual relation maps. Two-dimensional structured document maps are generated from the constructed key phrase frequency maps and contextual maps are generated using the self-organizing map and a combination of the Hessian matrix and the Perturbation technique.

In one embodiment, the unstructured text data includes complex sentences having multiple logical actions. They are referred to as multiple sentences. Each multiple sentence is split into simple, single sentences. A single sentence is a sentence having a single logical action. In one embodiment, multiple packets of finer resolution are extracted from unstructured text data. Each extracted packet includes multiple sentence structured text that is translated to single sentence structured text data, and each single sentence structured data includes fault information, such as aircraft fault information that facilitates categorizing and classifying the extracted multiple packets based on type of aircraft fault.

Other aspects of the invention will be apparent on reading the following detailed description of the invention and viewing the drawings that form a part thereof.

BRIEF DESCRIPTION OF THE DRAWINGS

The present subject matter is illustrated by way of example, and not by way of limitation, in the figures of the accompanying drawings in which like reference numerals refer to similar elements.

DETAILED DESCRIPTION

Figure 1:
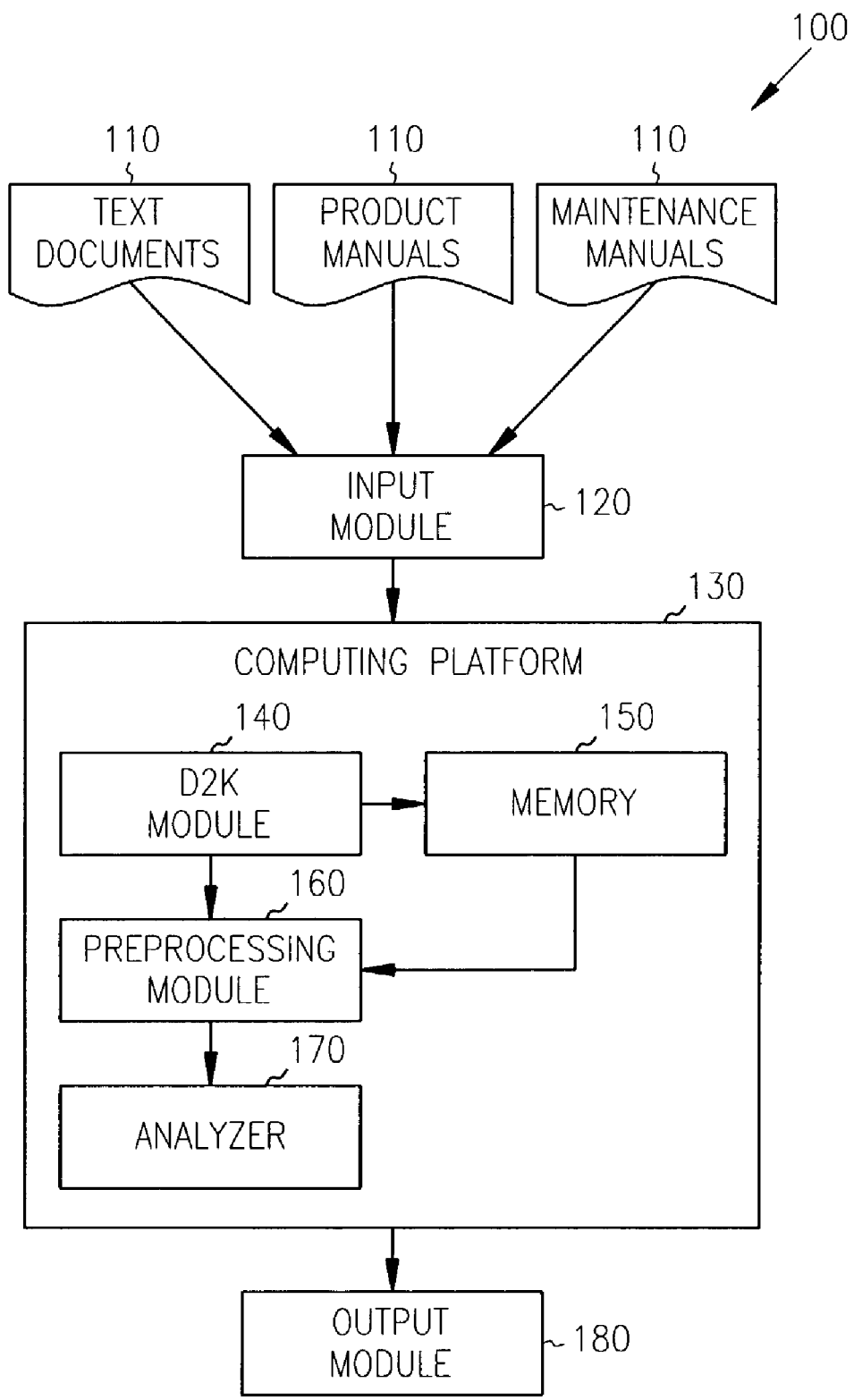
FIG. 1 is a block diagram showing functional modules of an identification and classification system.

In the following description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled. The following description of the embodiments and various features of the invention are grouped together in a single embodiment for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single disclosed embodiment. Thus the following claims are hereby incorporated into the description of the preferred embodiments, with each claim standing on its own as a separate preferred embodiment of the invention.

The present invention provides an intelligent information-mining system to extract desired intelligent information from unstructured text data in text documents. This is accomplished by obtaining unstructured text data from text documents in an electronic format that is then transformed into unstructured neutral format data. The transformed unstructured neutral format data is then converted into structured data. Desired intelligent information is then extracted by inputting the converted structured data into a multilayer self-organizing maps (MSOM) algorithm.

FIG. 1 is a schematic diagram illustrating functional modules of an identification and classification system. FIG. 1 includes an example of an identification and classification system 100 including an input module 120 coupled to receive unstructured data from documents 110, such as text documents, product manuals, and maintenance manuals. Also shown in FIG. 1, is computing platform 130 coupled to input module 120 and output module 180. As shown in FIG. 1, computing platform 130 includes D2K module 140, preprocessing module 160, analyzer 170, and memory 150.

In operation, input module 120 receives unstructured text data from documents 110. In some embodiments, unstructured text data can come from text documents, such as product manuals, maintenance manuals, and aircraft maintenance manuals. Input module 120 then outputs unstructured data in an electronic format.

Document-to-knowledge (D2K) module 140 then receives the unstructured data in electronic format from input module 120. D2K module 140 then transfers the received unstructured data into unstructured neutral format text data. D2K module 140 then converts the transformed unstructured neutral format text data into structured data including desired intelligent information. In some embodiments, D2K module 140 extracts multiple packets of finer resolution from the unstructured neutral format text data. In these embodiments, some extracted packets include multiple sentence structured data including information that facilitates in categorizing and classifying the converted multiple packets.

Preprocessing module 160 then receives each extracted packet, including the multiple sentence structured data, and forms a preprocessed packet including one or more simple sentences based on criteria that facilitates in extracting key phrases. In some embodiments, preprocessing module 160 uses criteria to extract key phrases, such as removing punctuation, removing all words comprised of three or fewer letters, filtering to remove general words, filtering to remove rarely used words and so on. In these embodiments, preprocessing module 160 transforms the extracted key phrases into a unique numerical representation.

Analyzer 170 then receives the preprocessed packets from preprocessing module 160 and extracts the desired intelligent information by using a multi-layer self-organizing maps (MSOM) algorithm. Desired intelligent information can include, for example, category and classification information, fault category and classification information, product category and classification information, and so on.

In one embodiment, the MSOM algorithm is described in co-pending, commonly assigned U.S. patent application Ser. No. 09/825,577, filed May 10, 2001, entitled "INDEXING OF KNOWLEDGE BASE USING MULTILAYER SELF-ORGANIZING MAPS WITH HESSIAN AND PERTURBATION INDUCED FAST LEARNING" is hereby incorporated by reference in its entirety. The MSOM algorithm as implemented in analyzer 170 extracts key-phrases from the unstructured text data, and transforms each of the extracted key-phrases into a unique numerical representation. The algorithm generates two or more layers of contextual relation maps by mapping the transformed text to two-dimensional maps, respectively using a self-organizing map and a combination of Hessian matrix and Perturbation (function approximation of neighborhood) techniques for speeding up a learning process. Word clusters are formed, and corresponding key phrase frequency histograms are constructed for each of the generated contextual relation maps. Two-dimensional structured document maps are generated from the constructed key phrase frequency maps and contextual maps are generated using the self-organizing map and a combination of the Hessian matrix and the Perturbation technique.

In some embodiments, analyzer 170 obtains a predetermined number of preprocessed packets from preprocessing module 160 and generates a template based on a two-dimensional structured document map. Analyzer 170 then extracts the desired category and classification information from each extracted preprocessed packet by projecting the extracted preprocessed packet onto the generated template. In these embodiments, analyzer 170 generates the template by generating a first layer contextual relation map. Analyzer 170 then constructs a first key phrase frequency histogram consisting of the frequency of occurrences of key phrases from the generated first layer contextual relation map. Analyzer 170 then generates the template based on the two-dimensional structured document map of the predetermined number of packets from the constructed first key phrase frequency histogram and the generated first layer contextual relation map by using the function approximation neighborhood technique in the self-organizing map.

In some embodiments, D2K module 140 stores the extracted packets. In these embodiments, preprocessing module 160 sequentially retrieves each stored packet from memory 150 and preprocesses the packets based on criteria that facilitate extracting desired intelligent information to form an associated preprocessed packet.

The following example embodiment further illustrates the process of extracting desired intelligent information using unstructured text data received from maintenance manuals 110, such as Boeing 757 aircraft maintenance and fault isolation manuals.

The following examples are illustrated using four packets extracted from unstructured text data in the Boeing 757 aircraft maintenance and fault isolation manuals using D2K module 140. The extracted packets are sequentially inputted into preprocessing module 160 to form associated preprocessed packets. Key phrases in the preprocessed packets are then transformed into unique numerical representations. Preprocessed packets are then sequentially inputted into analyzer 170. Analyzer 170 then extracts desired aircraft fault category and classification information by generating a first layer contextual relation map and an associated first key phrase frequency histogram consisting of the frequency of occurrences of key phrases and projecting the generated histogram onto a template generated based on a two-dimensional structured document map.

FIRST EXAMPLE

An extracted packet from the unstructured text in the Boeing 757 aircraft maintenance and fault isolation manuals can be as follows:
REPLACE THE PASSENGER ADDRESS AMPLIFIER, M177 (AMM 23-31-01/401).

This packet contains information or text advising a technician to replace an address amplifier that has the equipment numberM177. The technician is also referred to the appropriate Aircraft Maintenance Manual (AMM) and the text identified by the number following the AMM acronym describes how to replace the passenger address amplifier After preprocessing that includes determining how important the words are, the above sentence, it appears as follows:
REPLACE THE PASSENGER ADDRESS AMPLIFIER,
  REPLACE THE PASSENGER ADDRESS AMPLIFIER,
  REPLACE THE PASSENGER ADDRESS AMPLIFIER,
  AIRCRAFT MAINTENANCE MANUAL. AIRCRAFT MAINTENANCE MANUAL. AIRCRAFT MAINTENANCE MANUAL. AIRCRAFT MAINTENANCE MANUAL. AIRCRAFT MAINTENANCE MANUAL.

Important phrases of the sentence are repeated to highlight their contextual information.

After Text to Number Conversion, the sentence appears as follows:

```
(0.000000  0.039823  0.221842)  (0.199113  0.044368  0.176033)
(0.221842  0.035207  0.012170)  (0.176033  0.002434  0.014859)
(0.012170  0.002972  0.000000)
(0.000000  0.039823  0.221842)  (0.199113  0.044368  0.176033)
(0.221842  0.035207  0.012170)  (0.176033  0.002434  0.014859)
(0.012170  0.002972  0.000000)
(0.000000  0.039823  0.221842)  (0.199113  0.044368  0.176033)
(0.221842  0.035207  0.012170)  (0.176033  0.002434  0.014859)
(0.012170  0.002972  0.000000)
(0.000000  0.002743  0.143033)  (0.013717  0.028607  0.143073)
(0.143033  0.028615  0.000000)
(0.000000  0.002743  0.143033)  (0.013717  0.028607  0.143073)
(0.143033  0.028615  0.000000)
(0.000000  0.002743  0.143033)  (0.013717  0.028607  0.143073)
(0.143033  0.028615  0.000000)
(0.000000  0.002743  0.143033)  (0.013717  0.028607  0.143073)
(0.143033  0.028615  0.000000)
(0.000000  0.002743  0.143033)  (0.013717  0.028607  0.143073)
(0.143033  0.028615  0.000000)
(0.000000  0.002743  0.143033)  (0.013717  0.028607  0.143073)
(0.143033  0.028615  0.000000)
(0.000000  0.002743  0.143033)  (0.013717  0.028607  0.143073)
(0.143033  0.028615  0.000000)
(0.000000  0.002743  0.143033)  (0.013717  0.028607  0.143073)
(0.143033  0.028615  0.000000)
(0.000000  0.002743  0.143033)  (0.013717  0.028607  0.143073)
(0.143033  0.028615  0.000000)
```

These numbers are formed based on groups of three words at a time. The first set of numbers is based on the words "Replace the". The first number in the set is zero because there is no first word in the first set of words. The second set of words is "Replace the passenger". The sentence is processed in successive groups of three words to identify the context. These numbers are the numeric representation of the word using the unique word to number conversion algorithm. The numbers vary between 0 and 1.0 as it is normalized. This process is described in further detail in the MSOM algorithm.

After Semantic Mapping (SOM Layer 1) into a two dimensional map whose column and row size is determined by the number of words in the given set of text data of the given domain as shown below, the sentence appears as follows:

| | 0 | 1 | 2 | 3 | 4 | 5 | 6 | 7 | 8 |
|---|---|---|---|---|---|---|---|---|---|
| 1 | | | | | | | | | |
| 2 | | | | | | | | | |
| 3 | | | MAINTENANCE | | | | AIRCRAFT | REPLACE | |
| 4 | | | | | | | MANUAL | | |
| 5 | | | | | | | | | |
| 6 | | PASSENGER | | | | | | | |
| 7 | | | | | | | | | |
| 8 | | | | | | | | | |
| 9 | | | | | | | | | |
| 10 | THE | | | | | | | | |
| 11 | | | | | | | | | |
| 12 | | | | | | | | | |
| 13 | | | | | | | | | |
| 14 | | | | | | | | | |
| 15 | | | | AMPLIFIER | | | | | |

-continued

| 0 | 1 | 2 | 3 | 4 | 5 | 6 | 7 | 8 |
|---|---|---|---|---|---|---|---|---|
| 16 | | | | | | | | |
| 17 | | | | | | | | |
| 18 | ADDRESS | | | | | | | |

It is observed that the word "Maintenance" has an index of 3,2—row 3, column 2. There are 9 columns and 18 rows for this application domain. This map can be applied to any fault classification of text data in this domain. Empirical testing can be performed to find the optimal map size.

A user can select any number of rows and columns, which affects the granularity of the histogram that in turn affects the accuracy of the classification. A short sentence does not work well with a large map, just as a large sentence does not work well with a small map.

After normalizing the Histogram for the given sentence, it appears as follows:
3.000000 6.000000 0.000000 20.000000 0.000000 0.000000 10.000000 0.000000 0.000000 0.000000 0.000000 0.000000 3.000000 0.000000 0.000000 3.000000 0.000000 0.000000 0.000000 0.000000 0.000000 0.000000

The total size of the histogram is a 22 number set. The second map also called as structured document map is initialized with the 22 number set.

After projecting the Histogram of this sentence onto the Document Map, the matching cluster and sentence appear as follows:
Matching cluster as row 6 and column 3

The category and the classification of the sentence are: REPLACE FAULT (LRU FAULT), where LRU corresponds to line replaceable unit.

SECOND EXAMPLE

2. EXAMINE THE CIRCUIT FROM BULK CARGO HEAT MODE SELECT SWITCH, YDUS1, ON M912, TO EICAS COMPUTER (WDM 21-26-21).

After preprocessing that includes determining how important the words are, the above sentence, it appears as follows:
EXAMINE THE CIRCUIT FROM, EXAMINE THE CIRCUIT FROM, EXAMINE THE CIRCUIT FROM, WIRING DIAGRAM MANUAL. WIRING DIAGRAM MANUAL. WIRING DIAGRAM MANUAL. WIRING DIAGRAM MANUAL. WIRING DIAGRAM MANUAL.

After Text to Number Conversion, the sentence appears as follows:

(0.000000 0.012364 0.221842) (0.061819 0.044368 0.035666)
(0.221842 0.007133 0.071167) (0.035666 0.014233 0.000000)
(0.000000 0.012364 0.221842) (0.061819 0.044368 0.035666)
(0.221842 0.007133 0.071167) (0.035666 0.014233 0.000000)
(0.000000 0.012364 0.221842) (0.061819 0.044368 0.035666)
(0.221842 0.007133 0.071167) (0.035666 0.014233 0.000000)
(0.000000 0.051031 0.046512) (0.255155 0.009302 0.143073)
(0.046512 0.028615 0.000000) (0.000000 0.051031 0.046512)
(0.255155 0.009302 0.143073) (0.046512 0.028615 0.000000)
(0.000000 0.051031 0.046512)
(0.255155 0.009302 0.143073) (0.046512 0.028615 0.000000)
(0.000000 0.051031 0.046512)
(0.255155 0.009302 0.143073) (0.046512 0.028615 0.000000)
(0.000000 0.051031 0.046512)
(0.255155 0.009302 0.143073) (0.046512 0.028615 0.000000)
(0.000000 0.051031 0.046512)
(0.255155 0.009302 0.143073) (0.046512 0.028615 0.000000)
(0.000000 0.051031 0.046512)
(0.255155 0.009302 0.143073) (0.046512 0.028615 0.000000)
(0.000000 0.051031 0.046512)
(0.255155 0.009302 0.143073) (0.046512 0.028615 0.000000)
(0.000000 0.051031 0.046512)
(0.255155 0.009302 0.143073) (0.046512 0.028615 0.000000)
(0.000000 0.051031 0.046512)

After Semantic Mapping (SOM Layer 1), the sentence appears as follows:

| | 1 | 2 | 3 | 4 | 5 | 6 | 7 | 8 | 9 |
|---|---|---|---|---|---|---|---|---|---|
| 1 | | | | | | | | | |
| 2 | | | | | | | | | |
| 3 | | | | | | | | | |
| 4 | | | | | | | | | |
| 5 | | | | | | | | | |
| 6 | | | | | | | | | |
| 7 | | | | | DIAGRAM | | | | |
| 8 | | | | | EXAMINE | | | | WIRING |
| 9 | | | | | | | | | |
| 10 | | | | | | 1. FROM | | | |
| | | | | | | 2. MANUAL | | | |
| 11 | | | | | | | | | |
| 12 | | | | | | | | | |
| 13 | | | | | | | | | |
| 14 | | | | | | | | | |
| 15 | | | | | | | | | |
| 16 | | | | | | | | | |
| 17 | | | | | CIRCUIT | | | | |
| 18 | | | | | | | | | |
| 19 | | | | | | | | | |
| 20 | | | | | | | | | |
| 21 | | | | | | | | | |
| 22 | | | | | | | | | |
| 23 | | | | | | | | | |
| 24 | | | | THE | | | | | |

After normalizing the Histogram for the given sentence, it appears as follows:
00000 3.000000 0.000000 0.000000 0.000000 0.000000 0.000000 0.000000 0.000000 0.000000 0.000000 10.000000 0.000000 0.000000 0.000000 0.000000 0.000000 0.000000 0.000000 0.000000 3.000000 0.000000

After projecting the Histogram of this sentence onto the Document Map, the matching cluster and sentence appear as follows:

Matching cluster as row 3 column 1

The category and the classification of the sentence is: WIRING FAULT.

THIRD EXAMPLE

3. PREREQUISITES MAKE SURE THESE SYSTEMS WILL OPERATE: AIR/GROUND SYSTEM (AMM 32-09-02 /201).

After preprocessing the above sentence, it appears as follows:
ENSURE THAT THESE SYSTEMS, ENSURE THAT THESE SYSTEMS, ENSURE THAT THESE SYSTEMS, MAINTENANCE MANUAL. MAINTENANCE MANUAL. AIRCRAFT MAINTENANCE MANUAL. MAINTENANCE MANUAL. MAINTENANCE MANUAL.

After Text to Number Conversion, the sentence appears as follows:

| | | | | | |
|---|---|---|---|---|---|
| (0.000000 | 0.011814 | 0.221816) | (0.059070 | 0.044363 | 0.221846) |
| (0.221816 | 0.044369 | 0.215888) | (0.221846 | 0.043178 | 0.000000) |
| (0.000000 | 0.011814 | 0.221816) | (0.059070 | 0.044363 | 0.221846) |
| (0.221816 | 0.044369 | 0.215888) | (0.221846 | 0.043178 | 0.000000) |
| (0.000000 | 0.011814 | 0.221816) | (0.059070 | 0.044363 | 0.221846) |
| (0.221816 | 0.044369 | 0.215888) | (0.221846 | 0.043178 | 0.000000) |
| (0.000000 | 0.028607 | 0.143073) | (0.143033 | 0.028615 | 0.000000) |
| (0.000000 | 0.028607 | 0.143073) | (0.143033 | 0.028615 | 0.000000) |
| (0.000000 | 0.028607 | 0.143073) | (0.143033 | 0.028615 | 0.000000) |
| (0.000000 | 0.028607 | 0.143073) | (0.143033 | 0.028615 | 0.000000) |
| (0.000000 | 0.028607 | 0.143073) | (0.143033 | 0.028615 | 0.000000) |
| (0.000000 | 0.028607 | 0.143073) | (0.143033 | 0.028615 | 0.000000) |
| (0.000000 | 0.028607 | 0.143073) | (0.143033 | 0.028615 | 0.000000) |
| (0.000000 | 0.028607 | 0.143073) | (0.143033 | 0.028615 | 0.000000) |
| (0.000000 | 0.028607 | 0.143073) | (0.143033 | 0.028615 | 0.000000) |

After Semantic Mapping (SOM Layer 1), the sentence appears as follows:

After normalizing the Histogram for the given sentence, it appears as follows:
3.000000 0.000000 0.000000 13.000000 3.000000 0.000000 10.000000 0.000000 0.000000 0.000000 0.000000 0.000000 3.000000 0.000000 0.000000 0.000000 0.000000 0.000000 0.000000 0.000000 0.000000

After projecting the Histogram of this sentence onto the Document Map, the matching cluster and sentence appear as follows:

Matching cluster as row 9 column 2

The category and the classification of the sentence is: CONFIRMATION PROCEDURE.

FOURTH EXAMPLE

4. DO THE HYDRAULIC SYSTEM FAULT ISOLATION PROCEDURE (FIM 29-11-00, FIG. 116,117).

After preprocessing the above sentence, it appears as follows:
DO THE HYDRAULIC SYSTEM FAULT ISOLATION PROCEDURE, DO THE HYDRAULIC SYSTEM FAULT ISOLATION PROCEDURE, DO THE HYDRAULIC SYSTEM FAULT ISOLATION PROCEDURE. FAULT ISOLATION MANUAL. FAULT ISOLATION MANUAL. FAULT ISOLATION MANUAL. FAULT ISOLATION MANUAL. FAULT ISOLATION MANUAL.

After Text to Number Conversion, Triplets of the sentence appear as follows:

| | | | | | |
|---|---|---|---|---|---|
| (0.000000 | 0.000008 | 0.221842) | (0.000038 | 0.044368 | 0.095055) |
| (0.221842 | 0.019011 | 0.215888) | (0.095055 | 0.043178 | 0.066303) |
| (0.215888 | 0.013261 | 0.104379) | (0.066303 | 0.020876 | 0.180909) |
| (0.104379 | 0.036182 | 0.000000) | (0.000000 | 0.036182 | 0.000000) |
| (0.000000 | 0.000008 | 0.221842) | (0.000038 | 0.044368 | 0.095055) |
| (0.221842 | 0.019011 | 0.215888) | (0.095055 | 0.043178 | 0.066303) |
| (0.215888 | 0.013261 | 0.104379) | (0.066303 | 0.020876 | 0.180909) |
| (0.104379 | 0.036182 | 0.000000) | (0.000000 | 0.036182 | 0.000000) |
| (0.000000 | 0.000008 | 0.221842) | (0.000038 | 0.044368 | 0.095055) |

| | 1 | 2 | 3 | 4 | 5 | 6 | 7 | 8 | 9 |
|---|---|---|---|---|---|---|---|---|---|
| 1 | | | | | THAT | | | | |
| 2 | | | | | | | | | |
| 3 | | MAINTENANCE | | | | | | | |
| 4 | | | | | | MANUAL. | | | |
| 5 | | | | | | | | | |
| 6 | SYSTEMS. | | | | | | | | |
| 7 | | | | | ENSURE | | | | |
| 8 | | | | | | | | | |
| 9 | | | | | | | | | |
| 10 | | | | | | | | | |
| 11 | | | | | | | | | |
| 12 | | | | | | | | | |
| 13 | | | | | | | | | |
| 14 | | | | | | | | | |
| 15 | | | | | | | | | |
| 16 | | | | | | | | | |
| 17 | | | | | | | | | |
| 18 | | | | | | | | | |
| 19 | | | | | | | | | |
| 20 | | | | | | | THESE | | |

-continued

| | | | | | |
|---|---|---|---|---|---|
| (0.221842 | 0.019011 | 0.215888) | (0.095055 | 0.043178 | 0.066303) |
| (0.215888 | 0.013261 | 0.104379) | (0.066303 | 0.020876 | 0.180909) |
| (0.104379 | 0.036182 | 0.000000) | (0.000000 | 0.036182 | 0.000000) |
| (0.000000 | 0.013261 | 0.104379) | (0.066303 | 0.020876 | 0.143073) |
| (0.104379 | 0.028615 | 0.000000) | | | |
| (0.000000 | 0.013261 | 0.104379) | (0.066303 | 0.020876 | 0.143073) |
| (0.104379 | 0.028615 | 0.000000) | | | |
| (0.000000 | 0.013261 | 0.104379) | (0.066303 | 0.020876 | 0.143073) |
| (0.104379 | 0.028615 | 0.000000) | | | |
| (0.000000 | 0.013261 | 0.104379) | (0.066303 | 0.020876 | 0.143073) |
| (0.104379 | 0.028615 | 0.000000) | | | |
| (0.000000 | 0.013261 | 0.104379) | (0.066303 | 0.020876 | 0.143073) |
| (0.104379 | 0.028615 | 0.000000) | | | |
| (0.000000 | 0.013261 | 0.104379) | (0.066303 | 0.020876 | 0.143073) |
| (0.104379 | 0.028615 | 0.000000) | | | |
| (0.000000 | 0.013261 | 0.104379) | (0.066303 | 0.020876 | 0.143073) |
| (0.104379 | 0.028615 | 0.000000) | | | |
| (0.000000 | 0.013261 | 0.104379) | (0.066303 | 0.020876 | 0.143073) |
| (0.104379 | 0.028615 | 0.000000) | | | |
| (0.000000 | 0.013261 | 0.104379) | (0.066303 | 0.020876 | 0.143073) |
| (0.104379 | 0.028615 | 0.000000) | | | |
| (0.000000 | 0.013261 | 0.104379) | (0.066303 | 0.020876 | 0.143073) |
| (0.104379 | 0.028615 | 0.000000) | | | |

After Semantic Mapping (SOM Layer 1), the sentence appears as follows:

| | 0 | 1 | 2 | 3 | 4 | 5 | 6 | 7 | 8 | 9 |
|---|---|---|---|---|---|---|---|---|---|---|
| 0 | PROCEDURE. | | | | | | | | | |
| 1 | | | | | | | | | | |
| 2 | | | | | | | FAULT | | | |
| 3 | | | | | | | | FAULT | | |
| 4 | | | | | 1. PROCEDURE. | | | | | |
| | | | | | 2. MANUAL. | | | | | |
| 5 | | | | | | | | | | |
| 6 | | | | | | | | | | |
| 7 | | | | | DO | | | | | |
| 8 | | | | | | | | | | |
| 9 | | | | | | | | | | |
| 10 | | | | | | | | SYSTEM | | |
| 11 | | | | | | | | | | |
| 12 | | | | | | | | | | |
| 13 | | | | | | | | | | ISOLATION |
| 14 | | | | | | | | | | |
| 15 | HYDRAULIC | | | | | | | | | |
| 16 | | | | | | | THE | | | |
| 17 | | | | | | | | | | |
| 18 | | | | | | | | | | |
| 19 | | | ISOLATION | | | | | | | |

After normalizing the Histogram for the given sentence, it appears as follows:

```
3.000000  6.000000  12.000000  15.000000  0.000000
6.000000  15.000000  0.000000   0.000000   0.000000
0.000000  0.000000   0.000000   0.000000   0.000000
0.000000  0.000000   0.000000   0.000000   0.000000
0.000000  0.000000
```

After projecting the Histogram of this sentence onto the Document Map, the matching cluster and sentence appear as follows:

Matching cluster as row 9 column 14

The category and the classification of the sentence is: MAINTENANCE PROCEDURE.

Document Map for the above four categories of Faults

|   | 0 | 1 | 2 | 3 | 4 | 5 | 6 | 7 | 8 | 9 | 10 | 11 | 12 | 13 | 14 |
|---|---|---|---|---|---|---|---|---|---|---|----|----|----|----|----|
| 0 |   | Wiring Fault |   |   |   |   |   |   |   |   |    |    |    |    |    |
| 1 |   |   |   |   |   |   |   | LRU Fault |   |   |    |    |    |    |    |
| 2 |   |   |   |   |   |   |   |   |   |   |    |    |    | LRU Fault |   |
| 3 |   | Wiring Fault |   |   |   |   |   |   |   |   |    |    |    |    |    |
| 4 |   |   |   | Wiring Fault |   |   |   |   |   |   |    |    |    |    |    |
| 5 |   | Confirmation Procedure |   |   |   |   |   |   |   |   |    |    |    |    |    |
| 6 |   |   |   | LRU Fault |   |   |   |   |   |   |    |    |    |    |    |
| 7 |   |   |   |   |   |   |   |   | Maintenance Procedure |   |    |    |    |    |    |
| 8 |   |   |   |   | LRU Fault | Wiring Fault |   |   |   |   |    |    |    | Maintenance Procedure |   |
| 9 |   |   |   |   |   |   |   |   |   |   |    | Confirmation Procedure |   | Maintenance Procedure |   |
| 10 |   |   |   |   |   |   |   |   |   |   |    |    |    |    |    |
| 11 |   |   |   |   |   |   |   |   |   |   |    |    |    |    |    |
| 12 |   |   |   |   |   |   |   |   |   |   |    |    |    |    |    |
| 13 |   |   |   |   |   |   |   |   |   |   |    |    |    |    |    |
| 14 |   |   |   |   |   |   |   |   |   |   |    |    |    |    |    |

Figure 2:
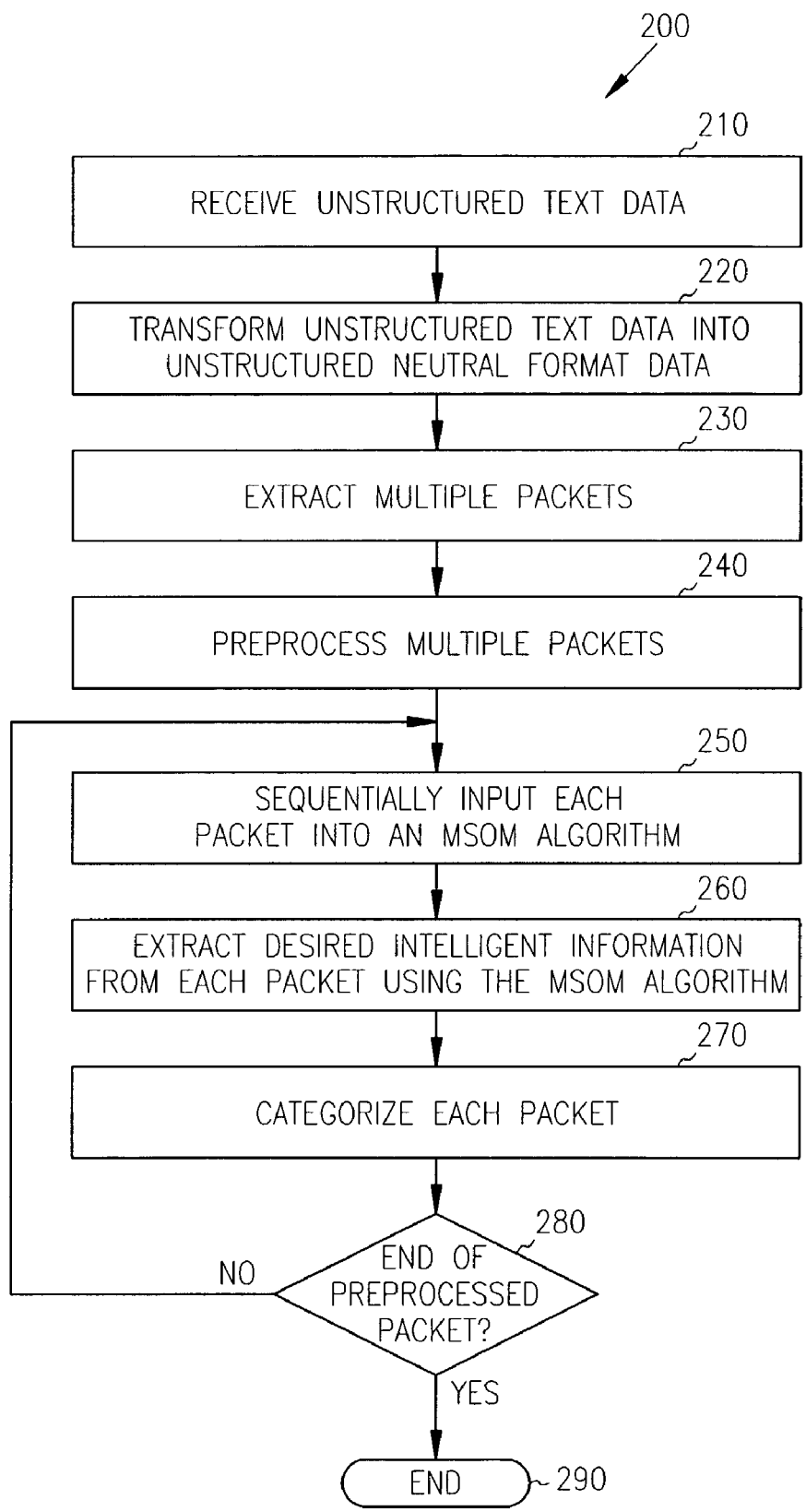
FIG. 2 is a flowchart showing the identification and classification scheme of the present invention.

FIG. 2 is a flowchart illustrating one example embodiment of a process 200 for extracting desired intelligent information, such as identification and classification of fault information from aircraft maintenance manuals according to the teachings of the present invention. The flowchart includes operations 210–290, which are arranged serially in the exemplary embodiment. Details of operation of the multi-layer self-organizing maps (MSOM) algorithm used in several process operations or steps in FIG. 2 are shown in further detail in FIG. 3. The process operations 210–290 are first applied to a training set/samples and the template (basis fault classification) is formed. Then process operations 210–290 are applied to chunks of text data to be classified, and is classified.

Other embodiments of the invention may execute two or more operations in parallel using multiple processors or a single processor organized as two or more virtual machines or sub-processors. Moreover, still other embodiments implement the operations as two or more specific interconnected hardware modules with related control and data signals communicated between and through the modules, or as portions of an application-specific integrated circuit. Thus, the exemplary process flow is applicable to software, firmware, and hardware implementations.

The process begins with operation 210 by receiving unstructured text data from text sources. Text sources can include documents, such as product manuals, sales manuals, maintenance manuals, service manuals, text documents, repair procedures, fault isolation procedures, troubleshooting manuals, wiring diagrams, legacy systems and other such documents that can contain unstructured text data. Unstructured data can include text data and signal components, such as analog and digital signals.

Operation 220 includes transforming unstructured text data into unstructured neutral format data. In some embodiments, transforming unstructured text data into unstructured neutral format data includes removing details and intricacies of a document format. Operation 230 includes converting the transformed unstructured neutral format data into structured data based on desired intelligent information. In some embodiments, neutral format data is obtained by extracting multiple packets of finer resolution information from the transformed unstructured neutral format based on desired intelligent information. In these embodiments, each extracted packet includes a single sentence structured data including information that facilitates in categorizing and classifying the extracted multiple packets. Also, in these embodiments, the single sentence structured data is extracted from one or more sentences of unstructured text data. The following examples illustrate one or more sentences of unstructured text data contained in aircraft maintenance and repair manuals.

EXAMPLE # 1

Including One or More Sentences

REPLACE THE PASSENGER ADDRESS AMPLIFIER, M1777 (AMM 23-31-01-401). IF THE PROBLEM CONTINUES, DO A CHECK OF THE CIRCUIT WIRING (WDM 23-31-11, WDM 23-31-12, WDM 23-31-13, WDM 23-31-14, WDM 23-31-16, WDM 23-31-17).

EXAMPLE # 2

Including One or More Sentences

REPLACE AILERON TRIM ACTUATOR (AMM 27-11-06). IF FAULT PERSISTS CHECK WIRING BETWEEN AILERON TRIM SWITCHES S1 AND S20N AFT ELECTRONIC CONTROL PANEL P8 FOR CONTINUITY.
REPEAT CIRCUIT AS NECESSARY (WDM 27-11-11).
Operation 240 includes preprocessing each packet. In some embodiments, this includes transforming multiple sentence data to each single sentence structured data and from single sentence structured data into context-based data based on contextual information and occurrence frequency. Further operation 250 includes sequentially inputting the preprocessed packets into a multi-layer self-organizing maps (MSOM) algorithm.

Operation 260 includes extracting desired intelligent information from each sequentially inputted packet by using the MSOM algorithm. In some embodiments, this includes obtaining a predetermined number of packets from the multiple extracted packets. A template based on a two-dimensional structured document map is then generated using the obtained predetermined number of packets. Desired intelligent information is then extracted from each remaining packets in the extracted multiple packets by projecting the remaining packets onto the generated template. In some embodiments, desired intelligent information includes extracting category and classification of fault information.

In some embodiments, generating the template further includes extracting key phrases by sequentially inputting the obtained predetermined number of packets. A first layer of contextual relation map is then generated by mapping each of the extracted key phrases onto a two-dimensional map using a self-organizing map and a function approximation neighborhood technique. Phrase clusters are then formed for the generated first layer contextual relation map. A first key phrase frequency histogram consisting of the frequency of occurrences of key phrases is then constructed from the generated first layer contextual relation map. A template based on the two-dimensional structured document map of the predetermined number of packets is then generated from the constructed first key phrase frequency histogram and generated first layer contextual relation map by using the function approximation neighborhood technique in the self-organizing map. In some embodiments, each of the extracted key phrases is then transformed into a unique numerical representation. In some embodiments, multiple extracted packets are stored into a database.

Operation 270 includes categorizing each packet based on the associated extracted desired intelligent information. Operation 280 checks whether all of the preprocessed packets are inputted, extracted, and categorized. If so, the operation ends 290. Otherwise, the operation goes to 250 and repeats operations 260, 270, and 280 described above for the next sequentially inputted packet. The process of extracting desired intelligent information, such as category and classification of fault information from each extracted packet, is described in more detail with reference to FIG. 1.

Figure 4:
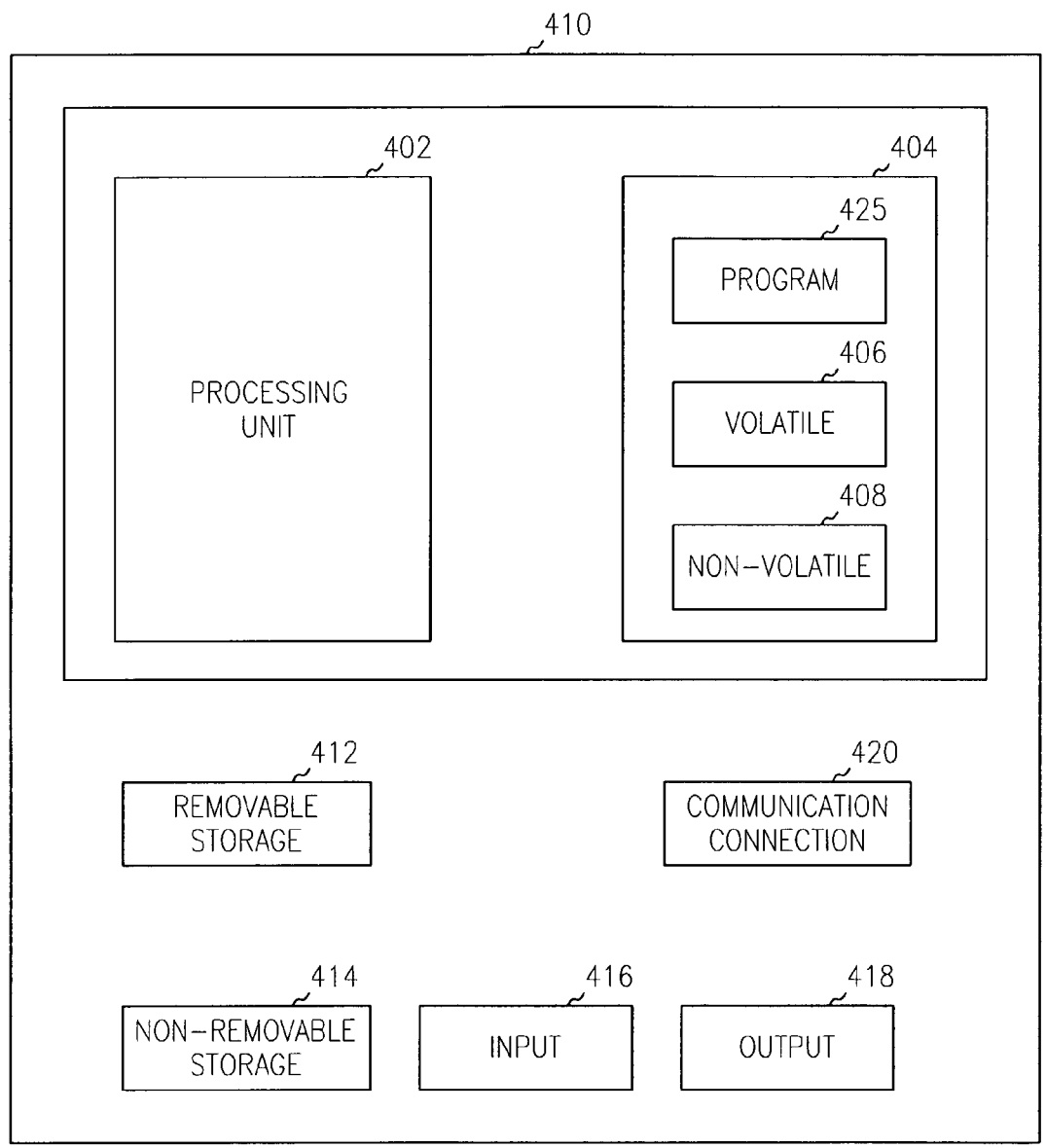
FIG. 4 is a block diagram example of a suitable computing system environment for implementing embodiments of the present invention, such as those shown in FIGS. 1, 2 and 3.

FIG. 4 shows an example of a suitable computing system environment 400 for implementing embodiments of the present invention, such as those shown in FIGS. 1 and 2. Various aspects of the present invention are implemented in software, which may be run in the environment shown in FIG. 4 or any other suitable computing environment. The present invention is operable in a number of other general purpose or special purpose computing environments. Some computing environments are personal computers, server computers, hand-held devices, laptop devices, multiprocessors, microprocessors, set-top boxes, programmable consumer electronics, network PCs, minicomputers, mainframe computers, distributed computing environments, and the like. The present invention may be implemented in part or in whole as computer-executable instructions, such as program modules that are executed by a computer. Generally, program modules include routines, programs, objects, components, data structures and the like to perform particular tasks or to implement particular abstract data types. In a distributed computing environment, program modules may be located in local or remote storage devices.

Figure 3:
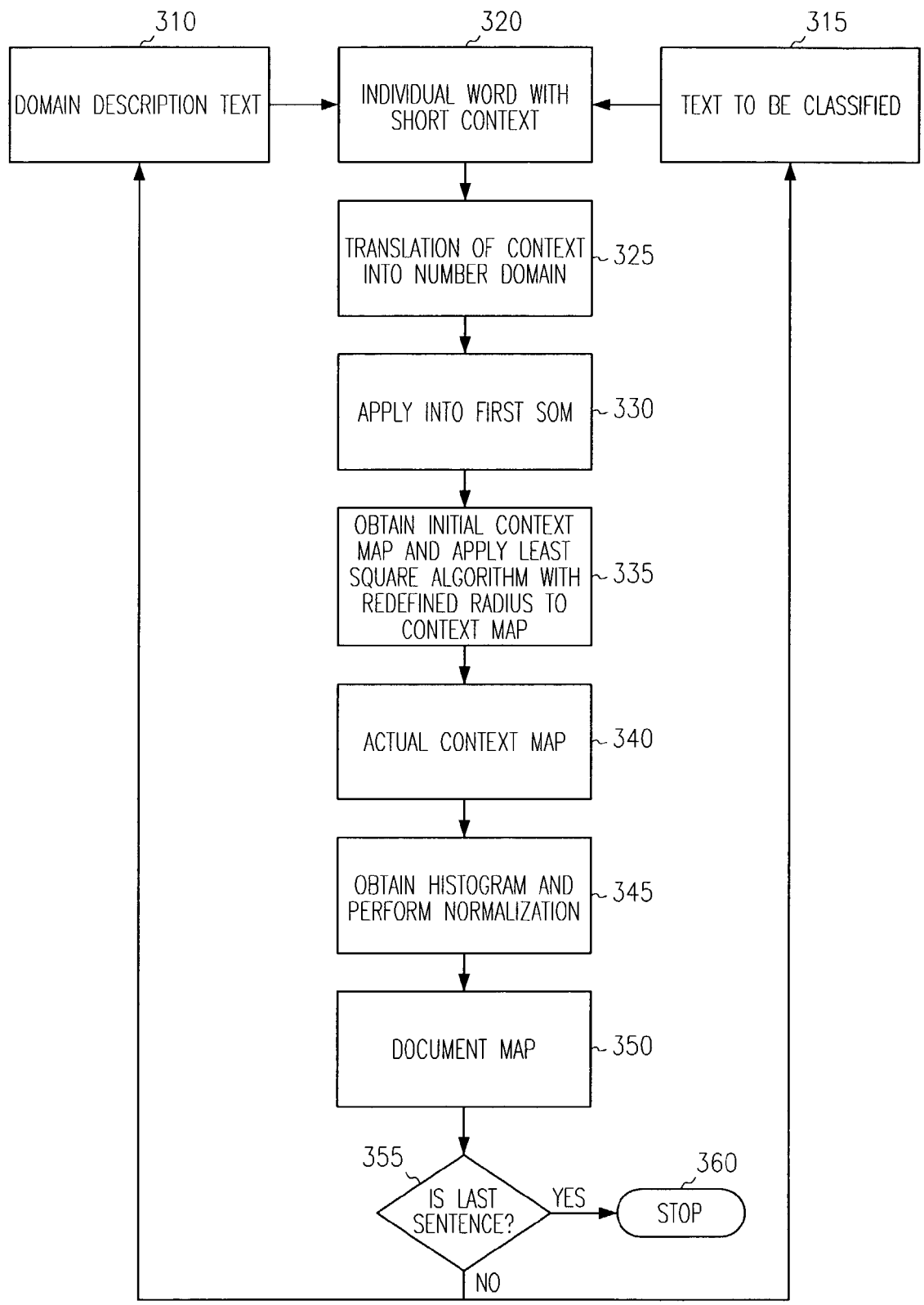
FIG. 3 is a flowchart showing a multilayer self-organizing maps (MSOM) algorithm.

Further detail of the MSOM algorithm is shown in FIG. 3 and is described in even further detail in the application incorporated by reference. The algorithm processes both training data 310, referred to as domain description text to train the algorithm to properly classify data. Text 315 to be classified is also processed, once the algorithm is trained. At 320, individual words with short context are identified from the received text. The context is translated in a number domain at 325, and applied into a first SOM 330. An initial context map is obtained, and a least square algorithm with redefined radius to context map is applied at 335. An actual context map is generated at 340. At 345, a histogram is obtained, and normalization is performed. A document map is then generated at 350. If the last sentence was just processed, the algorithm stops at 360. Otherwise, the next word with short context is obtained at 320 from either the training data or the text to be classified.

FIG. 4 shows a general computing device in the form of a computer 410, which may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes RAM, ROM, EPROM & EEPROM, flash memory or other memory technologies, CD ROM, Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers. The remote computer may include a personal computer, server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a computer-readable medium. For example, a computer program 425, capable of providing a generic communication system for COM based systems according to the teachings of the present invention, may be included on a CD-ROM and loaded from the CD-ROM to a hard drive. The computer-readable instructions allow computer 410 to extract desired intelligent information from unstructured data in text sources, such as product manuals, and aircraft maintenance and repair manuals and to further categorize the unstructured data into structured data based on the extracted intelligent information.

CONCLUSION

The present invention provides an intelligent information-mining system to extract desired intelligent information from unstructured text data in text sources and to categorize the unstructured text data based on the extracted desired intelligent information. This is accomplished by converting the unstructured data into structured data and inputting the converted structured data into a multilayer self-organizing maps (MSOM) algorithm.

The above description is intended to be illustrative, and not restrictive. Many other embodiments will be apparent to those skilled in the art. The scope of the invention should therefore be determined by the appended claims, along with the full scope of equivalents to which such claims are entitled.

What is claimed is:

1. A method of extracting intelligent information from text sources in electronic format, comprising:
receiving unstructured data from text sources in an electronic format;
transforming the unstructured data into unstructured neutral format data;
converting the transformed unstructured neutral format data into structured data based on desired intelligent information;
extracting desired intelligent information from the converted structured data by using a multilayer self-organizing maps (MSOM) algorithm; and
storing the desired intelligent information, wherein converting the transformed unstructured neutral format data into structured data based on desired intelligent information, comprises:
extracting multiple packets from the transformed unstructured neutral format data based on desired intelligent information, wherein each extracted packet includes multiple sentence structured text data that is translated to single sentence structured text data including information that facilitates in categorizing and classifying the extracted multiple packets; and
forming multiple preprocessed packets by transforming each single sentence structured data into context-based data based on contextual information and occurrence frequency.

2. The method of claim 1, wherein the received unstructured data comprises data selected from the group consisting of text data and signal components.

3. The method of claim 2, wherein the text sources are selected from the group consisting of the electronic formats of product manuals, sales manuals, maintenance manuals, service manuals, text documents, repair procedures, fault isolation procedures, troubleshooting manuals, wiring diagrams and legacy systems.

4. The method of claim 1, further comprising:
storing the converted structured data in a database.

5. The method of claim 1, further comprising:
sequentially inputting the multiple preprocessed packets into the MSOM algorithm to extract the desired intelligent information from each preprocessed packet.

6. A method of extracting intelligent information from unstructured text data in an electronic data format, comprising:
transforming the unstructured text data into unstructured neutral format text data;
converting the transformed unstructured neutral format text data into structured text data based on desired intelligent information by extracting multiple packets of finer resolution information from the transformed unstructured neutral format text data, wherein each extracted packet includes a single sentence structure data including fault information that facilitates in categorizing and classifying the extracted multiple packets;
inputting the extracted multiple packets into a multi-layer self-organizing maps (MSOM) algorithm;
extracting desired fault information from each inputted packet by using the MSOM algorithm; and
categorizing and classifying each extracted packet based on the extracted desired fault information; and
storing such categorization and classification of each extracted packet.

7. The method of claim 6, wherein inputting the converted neutral format text data into the MSOM algorithm comprises:
sequentially inputting the multiple extracted packets into the MSOM algorithm for extracting the desired information.

8. The method of claim 7, wherein sequentially inputting the one or more extracted packets into the MSOM algorithm for extracting the desired intelligent information comprises:
obtaining a predetermined number of packets from the multiple extracted packets;
generating a template based on a two-dimensional structured document map using the obtained predetermined number of packets from the multiple extracted packets; and
extracting the desired intelligent information from each remaining packet in the multiple extracted packets by projecting the remaining packet onto the generated template.

9. The method of claim 8, wherein generating the template based on a two-dimensional structured document map using the obtained predetermined number of packets, comprises:
extracting key phrases by sequentially inputting the obtained predetermined number of packets;
generating a first layer contextual relation map by mapping each of the extracted key phrases to a two-dimensional map using a self-organizing map and a function approximation neighborhood technique;
forming phrase clusters for the generated first layer contextual relation map;
constructing a first key phrase frequency histogram consisting of the frequency of occurrences of key phrases from the generated first layer contextual relation map; and
generating the template based on the two-dimensional structured document map of the predetermined number of packets from the constructed first key phrase frequency histogram and the generated first layer contextual relation map by using the function approximation neighborhood technique in the self-organizing map.

10. The method of claim 9, further comprising:
transforming each extracted key phrase into a unique numerical representation.

11. The method of claim 6, further comprising:
storing the multiple extracted packets in a database.

12. A physical computer-readable medium having computer-executable instructions for extracting desired intelligent information from unstructured data in aircraft maintenance manuals, comprising:

receiving unstructured text data in the aircraft maintenance manuals in an electronic format;

extracting multiple packets of finer resolution from the unstructured text data, wherein each extracted packet includes multiple sentence structured text data that is translated to single sentence structured text data, wherein each single sentence structured text data includes aircraft fault information that can facilitate in categorizing and classifying the extracted multiple packets based on type of aircraft fault;

obtaining a predetermined number of packets from the multiple extracted packets;

generating a template based on a two-dimensional structured document reap using the obtained predetermined number of packets from the multiple extracted packets; and extracting the desired category and classification information from each extracted packet by projecting the extracted packet onto the generated template; and storing such categorization and classification of each extracted packet, wherein generating the template based on a two-dimensional structured document map using the obtained predetermined number of packets, comprises:

extracting key phrases by sequentially inputting the obtained predetermined number of packets;

generating a first layer contextual relation man by mapping each of the extracted key phrases to a two-dimensional map using a self-organizing map and a function approximation neighborhood technique;

forming phrase clusters for the generated first layer of contextual relation map; and constructing a first key phrase frequency histogram consisting of the frequency of occurrences of key phrases from the generated first layer contextual relation map; and generating the template based on the two-dimensional structured document map of the predetermined number of packets from the constructed first key phrase frequency histogram and the generated first layer contextual relation map by using the function approximation neighborhood technique in the self-organizing map.

13. The computer-readable medium of claim 12, further comprising:

transforming the extracted key phrases into a unique numerical representation.

14. A computer system to perform data transfer operations between a remotely located communication module and one or more security devices in a COM-based computer network system having multiple users, comprising:

a processor, an output device; and a storage device to store instructions that are executable by the processor for extracting desired intelligent information from unstructured data in aircraft maintenance manuals, comprising:

receiving unstructured text data in the aircraft maintenance manuals in an electronic format;

extracting multiple packets of finer resolution from the unstructured text data, wherein each extracted packet includes multiple sentence structured text data that is translated to single sentence structured text data, wherein each single sentence structured text data includes aircraft fault information that can facilitate in categorizing and classifying the extracted multiple packets based on type of aircraft fault;

obtaining a predetermined number of packets from the multiple extracted packets;

generating a template based on a two-dimensional structured document map using the obtained predetermined number of packets from the multiple extracted packets; and extracting the desired category and classification information from each extracted packet by projecting the extracted packet onto the generated template; and storing such categorization and classification of each extracted packet.

15. The system of claim 14, wherein generating the template based on a two-dimensional structured document map using the obtained predetermined number of packets, comprises:

extracting key phrases by sequentially inputting the obtained predetermined number of packets;

generating a first layer contextual relation map by mapping each of the extracted key phrases to a two-dimensional map using a self-organizing map and a function approximation neighborhood technique;

forming phrase clusters for the generated first layer contextual relation map;

constructing a first key phrase frequency histogram consisting of the frequency of occurrences of key phrases from the generated first layer contextual relation map; and generating the template based on the two-dimensional structured document map of the predetermined number of packets from the constructed first key phrase frequency histogram and the generated first layer contextual relation map by using the function approximation neighborhood technique in the self-organizing map.

16. The system of claim 15, further comprising:

transforming the extracted key phrases into a unique numerical representation.

17. The system of claim 15, wherein generating the first layer contextual relation maps comprises:

generating the first layer of contextual relation maps by mapping each of the transformed multiple key phrases to a two-dimensional map using the associated self-organizing maps and the function approximation neighborhood technique.

* * * * *

UNITED STATES PATENT AND TRADEMARK OFFICE
CERTIFICATE OF CORRECTION

PATENT NO.         : 7,197,503 B2
APPLICATION NO. : 10/305809
DATED                 : March 27, 2007
INVENTOR(S)       : Palanisamy et al.

It is certified that error appears in the above-identified patent and that said Letters Patent is hereby corrected as shown below:

In column 5, line 36, after "amplifier" insert -- . --.

In column 8, line 62, delete "00000" and insert -- 26.000000 --, therefor.

In column 14, line 63, delete "S20N" and insert -- S2 ON --, therefor.

In column 19, line 18, in Claim 12, delete "reap" and insert -- map --, therefor.

In column 19, line 30, in Claim 12, delete "man" and insert -- map --, therefor.

In column 19, line 35, in Claim 12, after "map;" delete "and".

In column 19, line 54, in Claim 14, after "processor" delete "," and insert -- ; --, therefor.

Signed and Sealed this

Twenty-ninth Day of May, 2007

JON W. DUDAS
*Director of the United States Patent and Trademark Office*